United States Patent Office 3,106,174
Patented Oct. 8, 1963

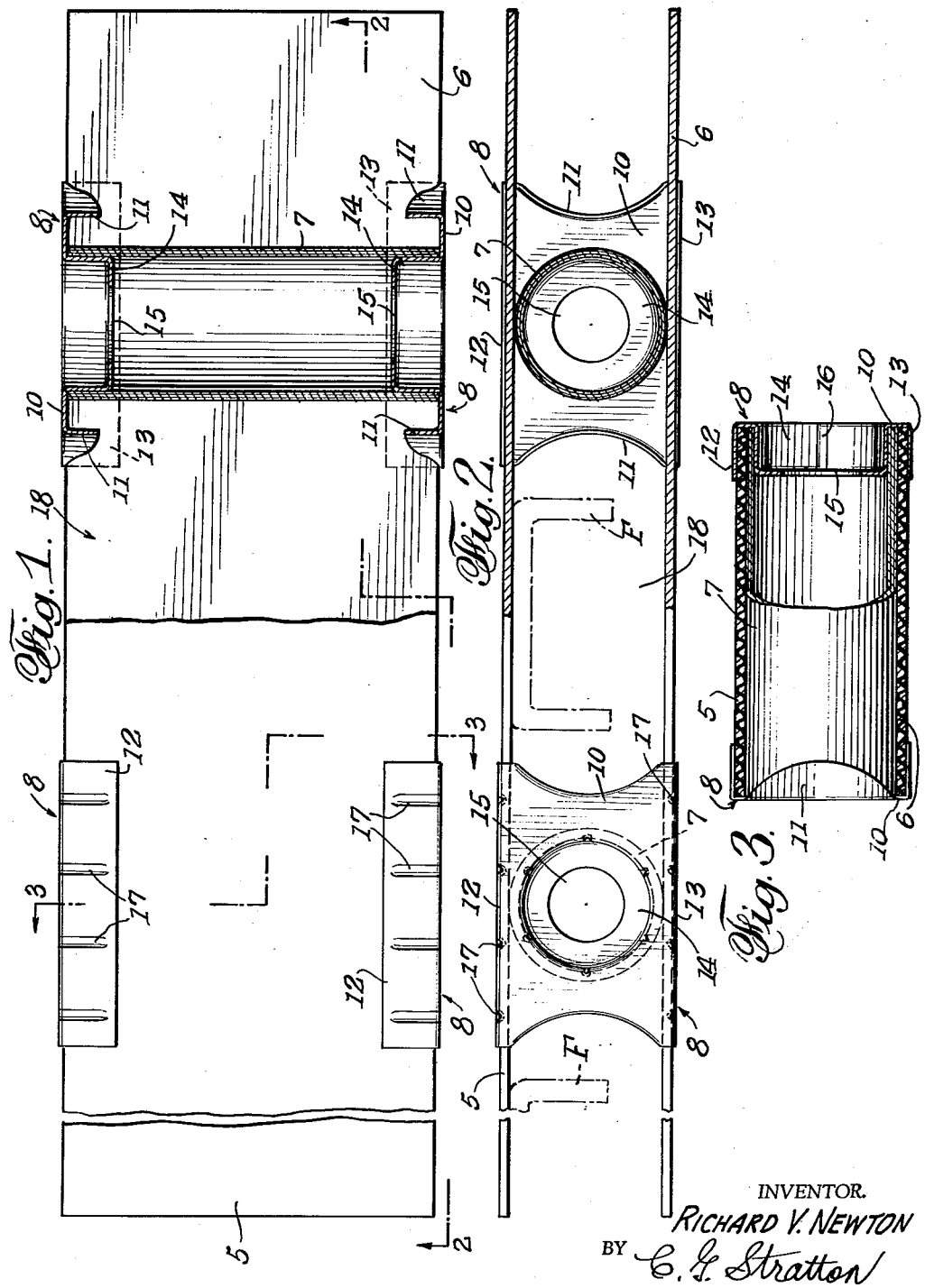

3,106,174
EXPENDABLE PALLET
Richard V. Newton, 19247 E. Rowland St., Covina, Calif.
Filed Dec. 26, 1961, Ser. No. 161,867
4 Claims. (Cl. 108—51)

This invention relates to pallets particularly for storing times and for facilitating transportation to and from storage.

An object of the present invention is to provide a pallet that is inexpensive to manufacture, light in weight, and made of such low-cost materials that, rather than storing the same, when not in use, and thereby using space that may be used more advantageously, may be discarded. In cases where flat piles or sheaves of sheet or board material are being transported, as from the manufacturer to the fabricator or consumer, piling such materials on pallets to facilitate handling by fork trucks both at the place of origin and the destination and/or storage is a normal way of handling such materials. However, since pallets are presently fabricated in a heavy and expensive manner, it is quite costly, not only to provide a large number of pallets because the same are ordinarily unavailable for return to the place of origin until the load thereon has been used up or otherwise removed, but the expense of such return of pallets, i.e., return of empties and the need for storing them until needed, imposes additional expense. The need for making such pallets to be strong and adapted for re-use, and the above-described double handling entailing an initial expense and additional costs as the pallets are shuttled back and forth from their place of origin and their different destinations, are disadvantages this invention seeks to overcome.

Another object of the invention is to provide a pallet, particularly for supporting flat-piled loads, that is fabricated of inexpensive and ordinarily weak materials but which is strengthened by the load to form an inexpensive and discardable device less expensive to use and discard than presently used and re-used pallets.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a plan view of a pallet constructed in accordance with the present invention, the same being partly broken away and in plan section.

FIG. 2 is a partial edge elevational and partial longitudinal sectional view as taken on the line 2—2 of FIG. 1.

FIG. 3 is a cross-sectional view as taken on line 3—3 of FIG. 1.

The present pallet comprises, generally, a pair of similar preferably parallel horizontal members 5 and 6, a plurality of transverse and longitudinally spaced tubes 7 between said members and serving to space the same, and pairs of clips 8 for connecting the ends of said tubes and the longitudinal edges of said members 5 and 6.

The pallet members 5 and 6 are similar in size and shape and are advantageously made of inexpensive sheet or board materials, such as corrugated pasteboard, plywood, or plastic sheet material. Such members are stiff enough to be form-retaining but by themselves have little strength or resistance to bending or even breaking under load. Such or similar materials are chosen primarily for their low cost and light weight. As will be later seen, said members are formed as elongated rectangles.

The transverse tubes 7 may vary in number depending on the length of the pallet. Two may be used, as shown, although three or more may be provided, uniformly spaced or not, as desired, the spaces being such as to accommodate the forks F of a lift truck. In the present pallet structure, the length of tubes 7 is the same as the width of the members 5 and 6, as can be seen in FIGS. 1 and 3.

Said tubes 7 are strongly yet inexpensively made of pasteboard of the type formed of helical and glued wrappings of such board. Such tubes are, nevertheless, light in weight and have high flattening resistance.

The clips 8 are preferably formed of thin-walled sheet metal that may be punched and drawn to the desired shape. Each said clip comprises a vertical wall 10 having concavely formed side edges that are provided with stiffening flanges 11, upper and lower flanges 12 and 13 bent from the respective upper and lower edges of the wall 10 and in flatwise contact with the respective members 5 and 6, said latter members, thereby, being confined between said flanges 12 and 13 and the tubes 7, and an inwardly drawn cup portion 14 formed from the center of wall 10 and of a diametral size to fit snugly within the end of tube 7. The bottom wall of said cup may have a hole 15 to facilitate drawing of the cup.

It will be clear that the clips 8 have endwise frictional fit into the end of the tubes 7 and over the opposite longitudinal edges of the members 5 and 6. The friction between the clips and the tube ends may be increased by embossments 16 in the cylindrical walls of the cups 14 and which bite into the compressible material of the tubes, and the friction between the clip flanges 12 and 13 and the respective members 5 and 6 may be increased by embossments 17 in said flanges and which bite into the compressible material of said latter members.

When the above described elements are assembled as a unitary pallet, one, two or more spaces 18 are defined between adjacent tubes 7, the same, as above indicated, being of a size to accommodate the fork of a lift truck. The described pallet, as will be realized, is quite inexpensive, is easily manually handled, and is sufficiently rigid to be form-retaining. However, the unsupported expanse of member 5 or 6, whichever defines the top of the pallet, is quite weak due to the light, thin material used for such members. However, when a heavy load of flatwise disposed material is placed upon the pallet top, the forks F of a lift truck can safely raise and transport said load since the top member of the pallet is strengthened by resistance of the load thereon to bending or other deformation. Particularly, two forks F produce a lifting span which provides for stability of the load and pallet during handling of the same.

When the forks deposit the pallet at a place of storage, the tubes 7 together with the stiffening of the clips afforded by the flanges 11 and the drawn cup 14, are adequately strong to bear the weight of the load without deformation. Upon removal of the load, the pallet may be discarded to eliminate the costs attending return of empties.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A pallet comprising
   (a) a pair of upper and lower thin, flat and parallel rectangular members,
   (b) a complement of pasteboard tubes in parallel array between said members, longitudinally spaced one from the other with their opposite ends coincidental to the longitudinal edges of the rectangular members,
   (c) a clip connecting each tube end with the related coincidental edges of the rectangular members,
   (d) means on each clip to frictionally engage both the rectangular members and the inside of said tube end,
   (e) a pair of flanges on each clip in respective flatwise engagement with the outer surfaces of the rectangular members, and
   (f) a drawn cup-like portion that extends into the tube end.

2. A pallet according to claim 1 in which said pair of flanges and the cup-like portion are provided with embossments that respectively press into the material of the rectangular members and the tubes.

3. A pallet comprising
   (a) a pair of upper and lower flat and parallel members each including opposed parallel side edges,
   (b) a complement of hollow tubular members having open ends disposed between said parallel members, longitudinally spaced one from the other with their open ends coincidental to adjacent ones of said parallel edges, and
   (c) a plurality of one-piece connecting clips, one associated with each of said open ends, each of said clips comprising a pair of flanges extending over said adjacent ones of said parallel edges to clamp said upper and lower members against the outside surfaces of said tubular members and a centrally disposed cup-like portion extending itno the open ends of said tubular members.

4. A pallet according to claim 3 in which each of said pairs of flanges and each of said cup-like portions includes embossments that respectively press into the material of said parallel members and said tubes.

References Cited in the file of this patent
UNITED STATES PATENTS

| | | |
|---|---|---|
| 2,876,896 | Zimmer | Mar. 10, 1959 |
| 2,930,481 | Bebie | Mar. 29, 1960 |